(12) United States Patent
Regensburger et al.

(10) Patent No.: US 7,230,640 B2
(45) Date of Patent: Jun. 12, 2007

(54) THREE-DIMENSIONAL PERCEPTION OF ENVIRONMENT

(75) Inventors: Uwe Regensburger, Ostfildern (DE); Alexander Schanz, Satteldorf (DE); Thomas Stahs, Ulm (DE)

(73) Assignee: DaimlerChrysler AG (DE)

( * ) Notice: Subject to any disclaimer, the term of this patent is extended or adjusted under 35 U.S.C. 154(b) by 348 days.

(21) Appl. No.: 10/106,599

(22) Filed: Mar. 26, 2002

(65) Prior Publication Data

US 2002/0169537 A1    Nov. 14, 2002

(30) Foreign Application Priority Data

Mar. 26, 2001   (DE) ................................. 101 14 932
Mar. 26, 2001   (DE) ............................ 201 05 340 U

(51) Int. Cl.
*H04N 7/18*   (2006.01)

(52) U.S. Cl. ..................... 348/115; 348/116; 348/119

(58) Field of Classification Search ........ 348/113–133, 348/143–159
See application file for complete search history.

(56) References Cited

U.S. PATENT DOCUMENTS

| 4,179,216 | A |   | 12/1979 | Theurer et al. |
| 4,490,038 | A |   | 12/1984 | Theurer et al. |
| 5,278,423 | A |   | 1/1994  | Wangler et al. |
| 5,475,494 | A | * | 12/1995 | Nishida et al. ............ 356/4.01 |
| 5,530,420 | A | * | 6/1996  | Tsuchiya et al. ............ 340/435 |
| 5,541,891 | A | * | 7/1996  | Waldmann et al. ........... 367/99 |
| 5,809,440 | A |   | 9/1998  | Beck et al. |
| 6,061,002 | A | * | 5/2000  | Weber et al. ............. 340/932.2 |
| 6,476,731 | B1 | * | 11/2002 | Miki et al. .................. 340/937 |
| 6,580,385 | B1 |   | 6/2003  | Winner et al. |
| 6,611,744 | B1 | * | 8/2003  | Shimazaki et al. ........... 701/41 |
| 6,704,653 | B2 | * | 3/2004  | Kuriya et al. ............... 701/301 |

FOREIGN PATENT DOCUMENTS

| DE | 297 18 862 U1 | 5/1998 |
| DE | 198 01 884 A1 | 7/1999 |
| DE | 197 41 896 C2 | 8/1999 |

* cited by examiner

*Primary Examiner*—Andy S. Rao
(74) *Attorney, Agent, or Firm*—Akerman & Senterfitt; Stephan A. Pendorf

(57) ABSTRACT

A vehicle-useful, high-resolution 3D-detection of the environment of a street vehicle with environment scanning sensors is not possible today. Depending on application the first commercially available vehicle integrated systems may be a comprise between resolution of the sensors and size of the sampled area. With the inventive two dimensional distance resolution sensor device it becomes possible, in contrast to those which are known, to produce a system which, installed in a street vehicle, detects and preferably processes complex dynamics scenarios such for example street traffic, from the prospective of the active dynamic moving vehicle. Therein a three dimensional image of the environment is produced using a distance sensor, which produces a two dimensional distance profile (depth profile), and on the other hand, using a data processing and a storage unit, which process and store sequential distance profiles and sequence a series of distance profiles into the three dimensional image of the environment.

27 Claims, 3 Drawing Sheets

THREE-DIMENSIONAL PERCEPTION OF ENVIRONMENT

BACKGROUND OF THE INVENTION

1. Field of the Invention

The invention concerns a device for three-dimensional determination of the environment about a street vehicle, comprising a distance sensor which produces a series of two dimensional distance profiles, and a data processing unit and a storage unit which preprocesses and store sequential distance profiles, and produce a three dimensional image of the environment from a sequence of distance profiles. The invention further comprises a process for three-dimensional determination of the environment about a street vehicle utilizing such a device.

It is not possible today to survey the environment around a street vehicle since there are no suitable vehicle-adapted, high-resolution three-dimensional environment-scanning sensors. Depending upon the application, the first vehicle assistance systems to become available on the market will likely involve a comprise between the resolution of the sample data and the size of the surveyed area. So, for example, the radar system for an ACC application must be limited to a few degrees of scan horizontally, while for a parking assistance device the surveying of the environment ahead of, beside and behind the vehicle with ultrasound allows only a limited range and resolution to be realized. Video based systems offer a high resolution, however no distance information.

2. Description of the Related Art

From the field of robotics infrared scanners are known, which are capable of using articulated rotating mirrors to collect three-dimensional environmental information. For employment in street vehicles such sensors are however only suitable for limited purposes, since on one hand the complex mechanics are not sufficiently robust for the employment in practice for the most diverse street applications, and on the other hand, such sensors are relatively expensive owing to their complexity.

For this reason in the automobile sector laser scanners are primarily employed, which are designed to scan a thin disk (2D) within the three dimensional environment and to provide a depth profile of the surveyed sector. In DE 3932 720 A1 a distance measuring device is described for contactless recognition of distance and relative position of objects. The presence of an object is detected by means of a narrow bundled infrared beam and the distance is determined by an ultrasound device. U.S. Pat. No. 6,151,539 A1 shows an autonomous vehicle, which utilizes multiple laser scanners for object detection. Herein in particular a laser scanner is set up for monitoring the rear environment of the vehicle, in which the total theoretical detection area of 360° is divided, by not described means, into parallel overlapping environmental areas of respectively 180° and 30° for a so called quasi three-dimensional object detection.

Schneider (Schneider et al., "Millimeter Wave Imaging of Traffic Scenarios", Intelligent Vehicles Symposium, Proc. IEEE, pp. 327-332) demonstrates the possibility of generating two-dimensional perspectives from three-dimensional data sets, here especially using a high-resolution radar system. The object therein is to classify vehicles on the basis of their two-dimensional view and to monitor their tracks, as well as to extract the street edge from the two dimensional view. A similar process to be employed in street vehicles for the recognition of a vacant driving space is also known from the subsequently published document DE 100 49 229 A1.

Systems for constructing three-dimensional environmental data on the basis of two-dimensional depth profile data taking into consideration the vehicle own movement are disclosed in documents U.S. Pat. No. 4,179,216 A1 and U.S. Pat. No. 4,490,038 A1 for the measurement of the profile of a railroad tunnel and the defect-free continuity of railway tracks, and, on the other hand, in U.S. Pat. No. 5,278,423 A1, systems are used in combination with the targeted application of pesticides and the determination of the extent of foliage within plantations. In all these systems a three-dimensional image of the environment is produced by the combination of a sequence of distance profiles using a data processing unit. In order to determine the spacing of the individual sequentially recorded profiles to each other, distance recorders are provided respectively in the wheels of the vehicle carrying the system.

A device for determining the position of an agricultural vehicle carrying a scanning sensor is described in U.S. Pat. No. 5,809,440 A1. Herein the track of the vehicle is followed by means of the global positioning system (GPS). Since the optical sensor used for recording plant growth however provides no distance information, the sequencing of the sensor information is able to produce only a two dimensional cartography of the environment.

In association with a street traffic scenario, a stationary system for determining and classifying vehicles passing the system is disclosed in U.S. Pat. No. 5,896,190 A1. Herein collected two-dimensional depth profiles from a laser scanner are combined for producing three-dimensional data. Therein the laser scanner is in a known fixed position above the vehicle roadway and monitors an area lying thereunder. Vehicles traveling through the scanned area are detected with sequential scans, from which the system sequentially extracts depth profiles. The speed information for correctly reconstructing a moving three dimensional traffic object from the two dimensional depth profile data is obtained by use of two light strata produced separately from the laser scanner. Therein the light strata are used in the sense of a light barrier for measuring speed, wherein entry of an object in the first light strata starts a clock and entry of the same object in the second light strata stops the clock. From the elapsed time and the known distance between both light barriers, the speed of the object can be calculated and therefrom a three dimensional image of the same can be constructed for the classification of the passing vehicle.

The devices known in the state of the art utilize, in reference to the aspect of the three dimensional determination of the environment, the analysis of static scenarios, such as inner walls of tunnels and the position of railroad tracks or the condition of the growth in fields or plantations. The three-dimensional image of the environment is not used therein in direct connection with actions of the sensor-carrying vehicles, but rather for documentation purposes or later statistical evaluation (determination of the growth density or planning of necessary repairs). Also, the device known from U.S. Pat. No. 5,896,190 A1 is essentially evaluated in a statistical scenario, in that a fixed point of a vehicular road is scanned or and locally occurring changes in condition (passage of vehicles) is detected and evaluated.

SUMMARY OF THE INVENTION

It is the task of the invention to provide a new type of device and a new type of process for obtaining three-dimensional environmental information from two-dimensional distance information.

The task is solved by a device for three-dimensional determination of the environment about a street vehicle, comprising a distance sensor which produces a series of two dimensional distance profiles, and a data processing unit and a storage unit which preprocesses and store sequential distance profiles, and produce a three dimensional image of the environment from a sequence of distance profiles. The invention further comprises a process for three-dimensional determination of the environment about a street vehicle utilizing such a device.

The inventive device for three-dimensional determination of the environment of a road vehicle, in particular for detection of parking spaces, comprises on the one hand a distance sensor, which produces a two dimensional distance profile (depth profile), and on the other hand, comprises a data processor and a storage unit, which process and store sequential distance profiles and from a sequential arrangement of a series of distance profiles to produce a three-dimensional image of the environment. Therein the device also includes a means for determining the traversed path of the street vehicle between the respective individually produced distance profiles.

In the framework of the present application, the concept of the two-dimensional distance profile or, as the case may be, two-dimensional depth profile, as provided by a distance sensor, is understood as the point-wise sampled distance resolution of a three-dimensional environment in a thin slice or section.

By this novel design of the inventive subject matter it is finally possible, in contrast to that which is known in the state of the art, to provide a system which is installed in a street vehicle and detects and evaluates to advantage complex dynamic scenarios such as for example vehicular traffic from the perspective of the active dynamic traveling vehicle.

BRIEF DESCRIPTION OF THE DRAWINGS

In the following the invention will be described in greater detail on the basis of illustrative embodiments and figures.

DETAILED DESCRIPTION OF THE INVENTION

Figure 1:
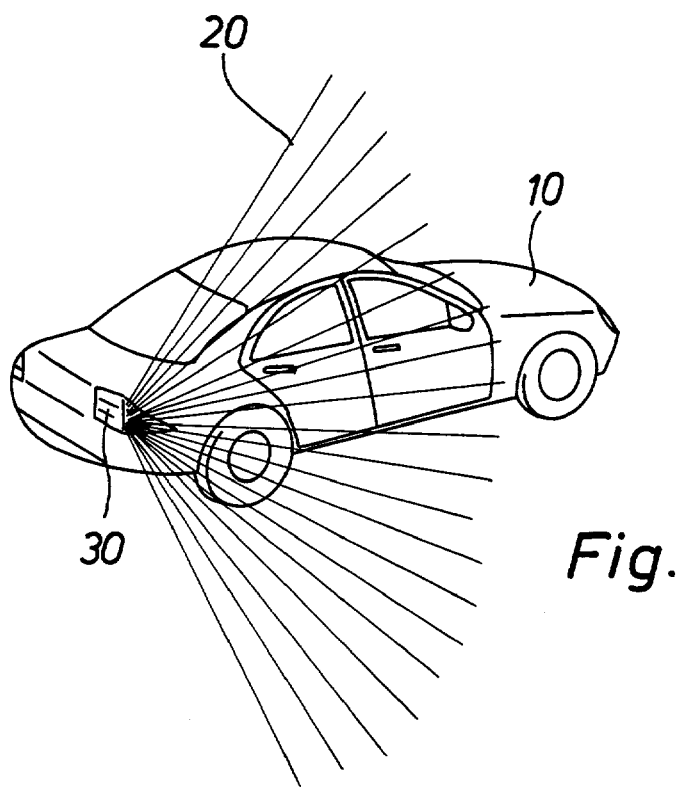
FIG. 1 shows a street vehicle, which samples a space perpendicular to the direction of travel using a laser scanner.

FIG. 1 shows one example of the integration of the inventive device for three-dimensional detection of the environment in a street vehicle 10. Therein the beam coverage 20 of the distance sensor is so oriented, that it scans the area to the side of the vehicle. Thereby, in the illustrated example, a surface area perpendicular to the direction of travel of the street vehicle is scanned by the beam coverage and therewith the surface area is surveyed with production of a two-dimensional distance (depth) profile. In the course of the movement of the vehicle 10 a regular sequence of new distance profiles is produced from the area adjacent to the vehicle, which, when combined, result in a three-dimensional image. In the example illustrated in FIG. 1 the distance sensor is integrated in advantageous manner in a rear or back-up light 30 of the street vehicle 10. The integration of the distance sensor in an area of the street vehicle 10 already occupied by an optical element offers the advantage, that the optical total impression of the vehicle is not substantially changed by the inventive device. Depending upon the desired application it is conceivable to house the distance sensor in the front, side or rear area of the street vehicle 10. It must only be ensured that the possibility is given to sample the environment to be sampled at an angle which is not parallel to the direction of travel. The angular area which the distance sensor surveys depends upon the intended employment of application and is essentially determined by the place of housing in the vehicle and the design of the vehicle.

The possible orientation of the beam pattern 20 is however not limited to that perpendicular to the direction in which the vehicle is traveling, but rather can also be oriented in various other conceivable orientations. In advantageous manner, in particular for improved determination of vertical objects (for example posts, traffic signs or street lamps) the beam coverage 20 can be tilted relative to the normal plane of the street surface, preferably by 45°.

Figure 2:
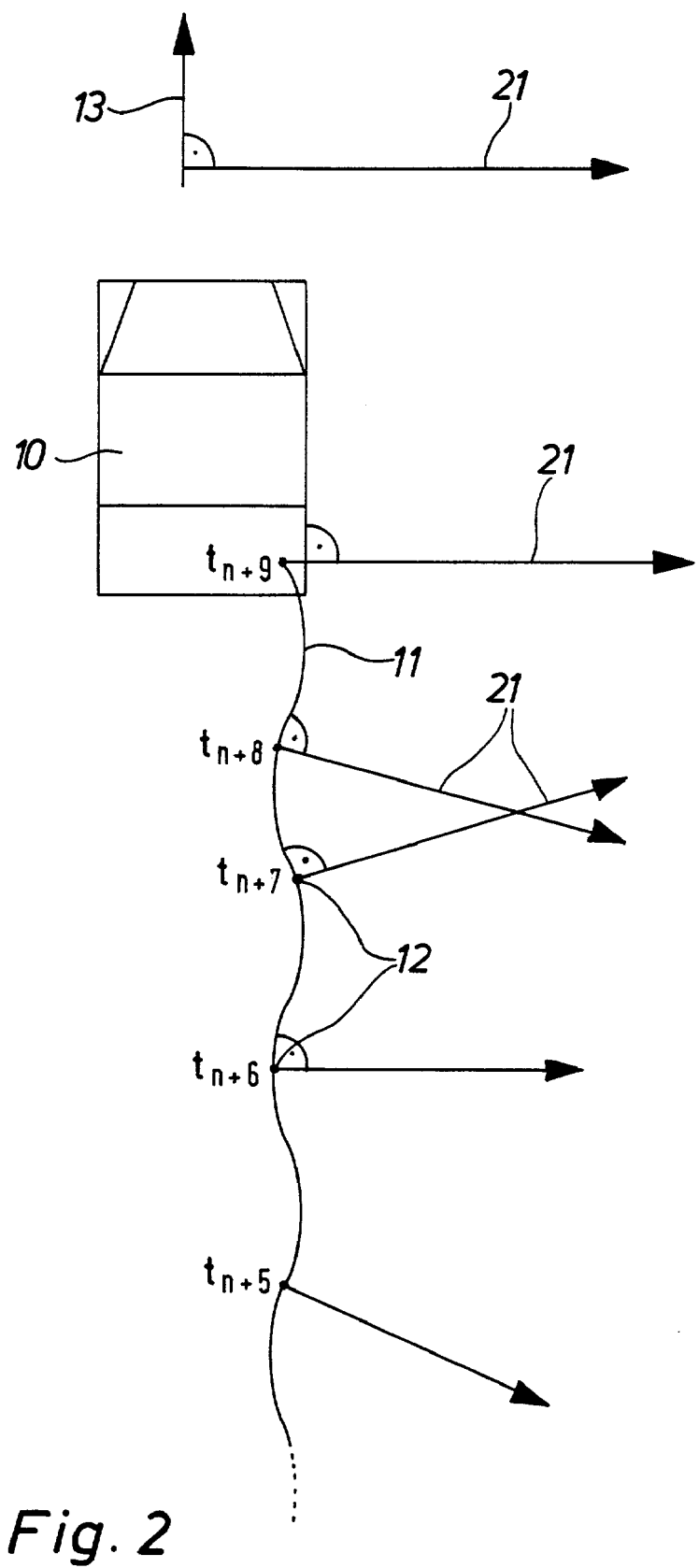
FIG. 2 shows a vehicle track of a dynamically moving street vehicle with the resulting direction of emission of a laser scanner oriented perpendicular to the direction of travel.

The traveled track 11 of a dynamic moving street vehicle 10 with the projection direction 21 of the beam path 20 for a laser scanner oriented perpendicular to the vehicle direction of traffic resulting from the track of the street vehicle 10 is shown for exemplary purposes in FIG. 2. The vehicle 10 moves along the track 12 in the direction of travel 13 wherein at the various time points $t_{n+5}, \ldots, t_{n+9}$ at individual measuring points 12 depth profiles are produced. The direction of emission 21 of the distance sensor, which here is for example perpendicular to the direction of travel 13, is shown for each individual point in time depending upon the orientation of the vehicle 10 in the most diverse directions. For this reason it is particularly advantageous when in accordance with the invention the device for three dimensional determination of the environment is supplemented with a means which at least determines in two spatial dimensions the relative position and orientation (angular orientation and/or tilt and attitude angle) of the vehicle within its environment. In this manner it is advantageously possible, in the framework of the inventive process, to correct for the variation of the orientation of the distance sensor caused by the own movement of the vehicle relative to the environment during the production of the three-dimensional image. In advantageous manner this relative position can be determined using data from a radar (for example an optical lidar or millimeter wavelength radar), a camera device with associated image processor or a navigation system.

Figure 3:
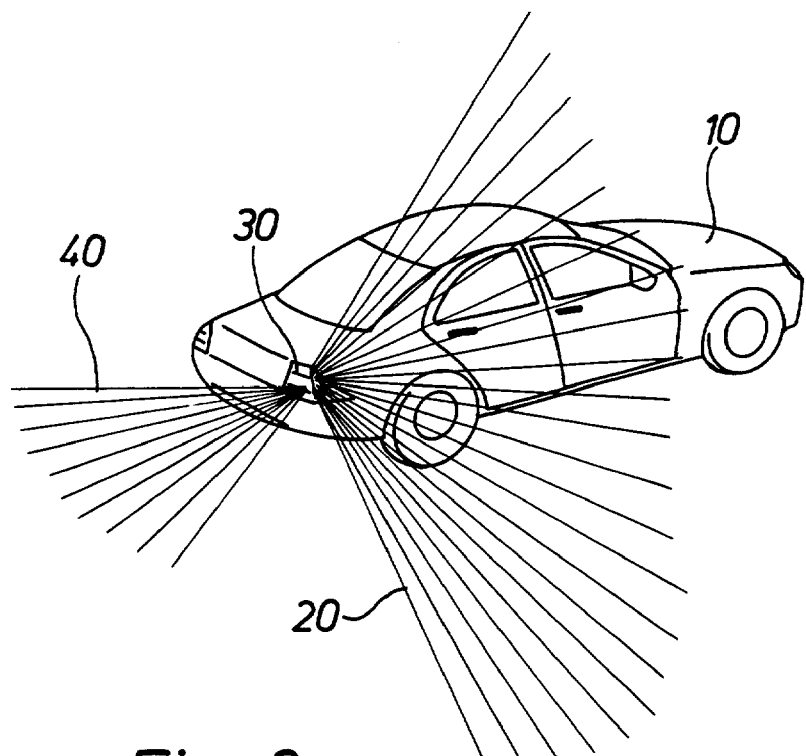
FIG. 3 shows a two-dimensional sampling laser scanner sample area divided into two spatial directions.

In FIG. 3 there is shown a particular inventive embodiment of the invention for determination of the relative position of the street vehicle 10. Therein the distance sensor is represented as being so designed, that a part of the split light sectors of the distance sensor are deflected into a different spatial area, other than that which is to be determined for three dimensional purposes by the assembly of sequential distance profiles. In this inventive manner the distance sensor utilizes two substantially independent beam patterns 20 and 40. With the beam pattern 20 the depth profile necessary for producing the three dimensional image of the environment is produced, while by means of the depth information obtained from the beam coverage 40 this is used in order to determine the relative position of the street vehicle 10 relative to its environment. By the determination of the relative position of the street vehicle 10 relative to its environment it becomes possible to correct for the dynamic variation of the orientation of the distance sensor produced by the movement of one's own vehicle 10 for the production of the three dimensional image of the environment.

In a particularly advantageous manner, the deflection of the beam of the distance sensor is achieved by the introduction of at least one mirror in the beam coverage path. It is entirely also conceivable to produce the beam deflection with other means or in combination with other means, such as, for example, lenses or prisms.

The orthogonal orientation relationship between the beam coverages 20 and 40 shown in FIG. 3 is purely exemplary and is essentially only dependent upon the task, the location of emitter housing and the geometry of the street vehicle 10. Also, the detection range of the two beam coverages 20 and 40 is essentially limited only by the respective task and only by the total possible detection range of the distance sensor. This limitation is based upon the fact, that the two beam paths are produced by suitable optics from the actually single beam path of the distance sensor. Since typically a total detection range of at least 270° can be presumed, no essential limitations are to be expected from this inventive design.

In an advantageous embodiment of the invention it is conceivable, in particular for reduction of the computer power necessary for data processing, to provide a means which suppresses the determination of the relative position of the street vehicle 10 relative to its environment. Herein it is also conceivable to carry out the determination of the relative position depending upon a settable or adjustable speed, or in dependence upon the task for which the three dimensional detection of the environment is utilized. Thus it is possible to presume, for example, that in the search for a free parking space the vehicular speed is generally reduced and safety is relatively not critical, such that an evaluation of the relative position of the street vehicle 10 can be suppressed.

The inventive device can be employed particularly advantageously with the object of detection of parking spaces. Thereby the potential parking spaces adjacent to the street vehicle 10 are continuously analyzed. For this, the free space is compared, in the framework of the analysis of the three dimensional environment data, with physical and dynamic measurements of the street vehicle. The dynamic measurements of the street vehicle are herein understood to be the those geometric dimensions of the outer area of such a vehicle which are necessary to make possible a safe dynamic placement thereof (for example, a vehicle among other things cannot simply park in that it moves perpendicular to its conventional direction of travel, but rather, it must be guided into the park position by dynamic steering and counter-steering, whereby the necessary space requirement exceeds the physical external dimensions of the street vehicle).

Figure 4:
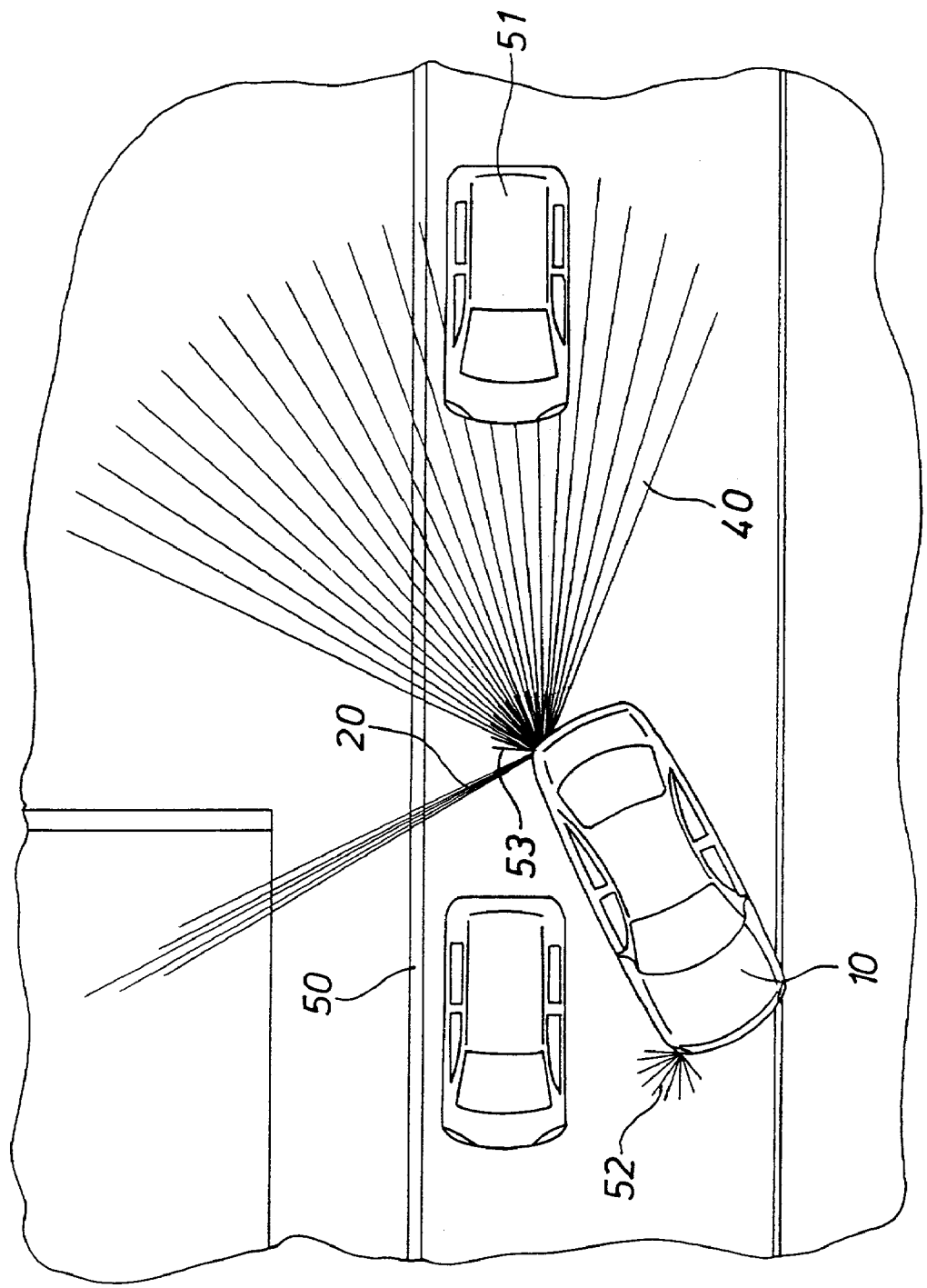
FIG. 4 shows a parking scenario employing the inventive device.

In the case that the free space is sufficiently large for parking the street vehicle 10, it is conceivable to signal this fact to the vehicle operator if requested, so that the operator can park the vehicle or relegate to it the autonomous parking of the vehicle. In FIG. 4 a parking scenario utilizing the inventive device is illustrated. Herein in advantageous manner the distance to the road edge 50 is monitored by the beam coverage, while the beam coverage 40 is used for determining the position of the vehicle 10 and for monitoring the separation from a parked vehicle 51. In particularly advantageous manner it is conceivable, particularly for near-range navigation, to incorporate sensor information from environmental sensors 52 and 53 already present in the vehicle 10 for improvement or as the case may be verifying the parking.

A distance sensor, as shown in the framework of the inventive process, provides in the framework of its sensing a distance profile with multiple values depending upon its distance resolution over the entire angular area for each sampled angular segment, depending upon its angular resolution. Therein these values generally correspond to the intensity of the reflected signals and provide in the first instance information regarding the presence of an object within a distance cell. It is also conceivable in advantageous manner, that the inventive process, in particular for reduction of data, is so designed, that essentially in correspondence with the process described in subsequently published application DE 100 49 229 A1 for each distance cell within the area measured by the distance sensor only the therein most significant or stand-out point from the sampled values is stored and further processed. This process is based upon the consideration, that it is sufficient to recognize one object and to estimate the height thereof, the precise shape within this highest elevation however being unnecessary with respect to the estimation of the free space within which the vehicle has to operate. According to this process the three-dimensional image of the environment generated in accordance with the invention has a birds-eye view in which the individual loci of the maximal height values are registered. In robotics, such a representation is also referred to as a 2.5 dimensional imaging of the space. It is conceivable in advantageous manner to further quantify this representation and therewith among other things to further reduce the quantity of data, whereby the processing speed is supplementally increased. For this, there can be carried out for example task-specific quantification steps, which are in particular of high relevance during the parking process for street vehicles (for example "no object", "possible collision object", "not collision object"). An example of a "possible collision object" during the use of the invention for parking is a traffic barrier. The quantification therein could for example occur on the basis of a threshold value comparison.

The invention claimed is:

1. A device for three-dimensional determination of the environment about a street vehicle dynamically moving in a travel direction, comprising:
   only a single distance sensor, the single distance sensor having a beam coverage with an orientation not parallel to the travel direction of the street vehicle, the distance sensor producing a series of two dimensional distance profiles,
   a data processing unit and a storage unit, which preprocess and store a sequence of distance profiles produced at different time points along a travel track in the travel direction of the street vehicle, and produce a three dimensional image of the environment from the sequence of distance profiles, and
   a means for determining the distance covered by the street vehicle between each individual produced distance profile.

2. The device according to claim 1, further comprising a supplemental means for determining at least in two spatial dimensions the relative position and the orientation of the vehicle within the environment.

3. The device according to claim 2, wherein the supplemental means for determination of the relative position is a radar.

4. The device according to claim 3, wherein said radar is a millimeter wavelength radar or a lidar.

5. The device according to claim 2, wherein the supplemental means for determination of the relative position is a camera device with associated video image processor is provided.

6. The device according to claim 2, wherein tho supplemental means for determination of the relative position is a navigation system.

7. The device according to claim 2, wherein a moans is provided in connection with a distance sensor, such that a part of the span of the beam scan of the distance sensor is deflected into a different spatial area than that which was to be determined three-dimensionally by sequential arrangement of distance profiles, whereby distance information and variance over time detected from this part of the light sector can be used for determining the relative position.

8. The device according to claim 7, wherein the means for the beam defection is a mirror.

9. The device according to claim 2, further including a means for suppressing the determination of the relative position.

10. The device according to claim 1, wherein the distance sensor is so arranged that the distance sensor is so positioned that the distance profile is recorded at an angle relative to the normal plane on the road surface.

11. The device according to claim 10, wherein said angle relative to the normal plane on the road surface is an angle of approximately 45°.

12. The device according to claim 1, wherein the device is integrated in an optical element provided on the street vehicle.

13. The device according to claim 12, wherein the optical clement is a back-up light or a headlight.

14. The device according to claim 1, wherein said device is adapted for detection of parking spaces.

15. A process for three-dimensional determination of the environment about a street vehicle dynamically moving in a travel direction, said process comprising:
    producing a two-dimensional distance profile by means of only a single distance sensor, the single distance sensor having a beam coverage with an orientation not parallel to the travel direction of the street vehicle,
    processing and storing a sequence of distance profiles at different time points along a travel track in the travel direction of the street vehicle via a data processing unit and a storage unit and producing a three dimensional image of the environment from the sequence of distance profiles, and
    determining the path covered between each of the individual produced distance profiles using a distance measuring means.

16. The process according to claim 15, further comprising determining the relative position and the orientation of the vehicle within its environment in at least in two spatial dimensions, and correction for the variations of the orientation of the distance sensors during the production of the three dimensional image of the environment due to the own movement of the vehicle.

17. The process according to claim 16, wherein the relative position is determined by means of a radar with an associated radar signal processor.

18. The process according to claim 16, wherein the relative position is determined using a camera arrangement with associated video image processor.

19. The process according to claim 16, further comprising deflecting a part of the span of the beam scan of the distance sensor into a different spatial area than that which was to be determined three-dimensionally by sequential arrangement of distance profiles, and using distance information and variance over time detected from this part of the light sector for determining the relative position.

20. The process according to claim 16, wherein the determination of the relative position occurs only upon exceeding a preset speed and otherwise is suppressed.

21. The process according to claim 15, wherein for each distance cell within the area to be measured by the distance sensor only the peak point occurring therein is stored and further processed, such that the generated three dimensional image of the environment provides a birds eye view within which in the individual loci the pea values are extracted.

22. The process according to claim 21, wherein task-specific quantification steps are employed for the further quantification.

23. The process according to claim 22, wherein three task specific quantification steps are employed.

24. The process according to claim 23, wherein said three task specific quantification steps are "no object", "potential collision object", and "not potential collision object".

25. The process according to claim 23, comprising using a threshold comparison as the basis for the quantification.

26. The process according to claim 15, comprising
    carrying out a continuous analysis of the potential parking spaces adjacent to the vehicle, and
    comparing the detected free spares within the framework of the analysis of the three dimensional environmental data with the physical and dynamic measurements of the street vehicle.

27. The process according to claim 15, wherein said process is a process for detection of parking spaces.

* * * * *